(12) United States Patent
Champagne et al.

(10) Patent No.: US 10,155,531 B2
(45) Date of Patent: Dec. 18, 2018

(54) PROVIDING ASSIST TORQUE WITHOUT HAND WHEEL TORQUE SENSOR

(71) Applicant: Steering Solutions IP Holding Corporation, Saginaw, MI (US)

(72) Inventors: Anthony J. Champagne, Saginaw, MI (US); Timothy W. Kaufmann, Frankenmuth, MI (US); Kathryn L. Pattok, Frankenmuth, MI (US); Tejas M. Varunjikar, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/263,162

(22) Filed: Apr. 28, 2014

(65) Prior Publication Data

US 2014/0324294 A1   Oct. 30, 2014

Related U.S. Application Data (60) Provisional application No. 61/817,578, filed on Apr. 30, 2013, provisional application No. 61/904,691, filed on Nov. 15, 2013.

(51) Int. Cl.
*B62D 5/04* (2006.01)
*B62D 6/00* (2006.01)

(52) U.S. Cl.
CPC ........... *B62D 5/0463* (2013.01); *B62D 5/049* (2013.01); *B62D 5/0484* (2013.01); *B62D 6/001* (2013.01)

(58) Field of Classification Search
None
See application file for complete search history.

(56) References Cited

U.S. PATENT DOCUMENTS

| | | | |
|---|---|---|---|
| 4,660,671 A | 4/1987 | Behr et al. | |
| 4,800,974 A | 1/1989 | Wand et al. | |
| 4,874,053 A | 10/1989 | Kimura et al. | |
| 5,029,466 A | 7/1991 | Nishihara et al. | |
| 5,473,539 A | 12/1995 | Shimizu et al. | |

(Continued)

FOREIGN PATENT DOCUMENTS

| | | |
|---|---|---|
| CN | 1442336 A | 9/2003 |
| CN | 1651293 A | 8/2005 |

(Continued)

OTHER PUBLICATIONS

Gillespie, T.D.; "Fundamentals of Vehicle Dynamics"; Warrendale, PA; Society of Automotive Engineers; 1992; ISBN 1560911999, 9781560911999; pp. 205-206.

(Continued)

*Primary Examiner* — Mussa A Shaawat
*Assistant Examiner* — Kyung Kim
(74) *Attorney, Agent, or Firm* — Cantor Colburn LLP (57) ABSTRACT

A method of controlling an electric power steering system of a vehicle is provided. The method determines that one or more hand wheel torque sensors of the vehicle are not enabled. The method generates an assist torque command by estimating a lateral acceleration of the vehicle based on a hand wheel angle and determining an amount of assist torque based on the estimated lateral acceleration. The method controls the electric power steering system using the generated assist torque command.

19 Claims, 8 Drawing Sheets

(56) References Cited

U.S. PATENT DOCUMENTS

| | | |
|---|---|---|
| 5,482,129 A | 1/1996 | Shimizu |
| 5,709,281 A | 1/1998 | Sherwin et al. |
| 5,919,241 A | 7/1999 | Bolourchi et al. |
| 5,927,421 A | 7/1999 | Fukada |
| 5,948,030 A | 9/1999 | Miller et al. |
| 5,992,557 A | 11/1999 | Nakamura et al. |
| 6,032,091 A | 2/2000 | Noro et al. |
| 6,152,254 A | 11/2000 | Phillips |
| 6,223,852 B1 | 5/2001 | Mukai et al. |
| 6,250,419 B1 | 6/2001 | Chabaan et al. |
| 6,298,941 B1 | 10/2001 | Spadafora |
| 6,370,459 B1 | 4/2002 | Phillips |
| 6,425,454 B1 | 7/2002 | Chabaan et al. |
| 6,588,541 B2 | 7/2003 | Norman et al. |
| 6,687,590 B2 | 2/2004 | Kifuku et al. |
| 6,690,137 B2 | 2/2004 | Iwaji et al. |
| 6,742,620 B2 | 6/2004 | Eidam et al. |
| 6,799,656 B2 | 10/2004 | Kimura et al. |
| 6,959,970 B2 | 11/2005 | Tseng |
| 7,040,450 B2 | 5/2006 | Nagase et al. |
| 7,558,661 B2 | 7/2009 | Sundaram et al. |
| 7,596,441 B2 | 9/2009 | Yokota et al. |
| 7,613,258 B2 | 11/2009 | Yu et al. |
| 7,885,750 B2 | 2/2011 | Lu |
| 7,954,593 B2 | 6/2011 | Dornhege et al. |
| 7,974,754 B2 | 7/2011 | Nakatsu |
| 7,975,801 B2 | 7/2011 | Tashiro |
| 8,010,252 B2 | 8/2011 | Getman et al. |
| 8,108,105 B2 | 1/2012 | Saruwatari et al. |
| 8,165,770 B2 | 4/2012 | Getman et al. |
| 8,170,751 B2 | 5/2012 | Lee et al. |
| 8,175,771 B2 | 5/2012 | Ukai et al. |
| 8,219,283 B2 | 7/2012 | Recker et al. |
| 8,548,667 B2 | 10/2013 | Kaufmann et al. |
| 8,571,759 B2 | 10/2013 | Oblizajek et al. |
| 8,666,605 B2 | 3/2014 | Delarche et al. |
| 8,666,607 B2 | 3/2014 | Kojo |
| 8,798,864 B2 | 8/2014 | Champagne et al. |
| 8,825,301 B2 | 9/2014 | Sugawara et al. |
| 8,843,276 B2 | 9/2014 | Kojo et al. |
| 8,903,606 B2 | 12/2014 | Kleinau et al. |
| 8,977,433 B2 | 3/2015 | Kojima |
| 8,977,436 B2 | 3/2015 | Endo et al. |
| 8,977,437 B2 | 3/2015 | Tamaizumi et al. |
| 9,067,601 B2 | 6/2015 | Itabashi et al. |
| 9,327,761 B2 | 5/2016 | Tsubaki |
| 9,387,875 B2 | 7/2016 | Shimizu et al. |
| 9,409,595 B2 | 8/2016 | Varunjikar et al. |
| 9,452,775 B2 | 9/2016 | Tamura et al. |
| 9,545,945 B2 | 1/2017 | Akatsuka et al. |
| 9,676,409 B2 | 6/2017 | Champagne et al. |
| 2002/0005316 A1 | 1/2002 | Tokumoto |
| 2002/0026267 A1 | 2/2002 | Kifuku |
| 2002/0092696 A1 | 7/2002 | Bohner et al. |
| 2002/0177932 A1 | 11/2002 | Kifuku et al. |
| 2002/0179362 A1 | 12/2002 | Norman et al. |
| 2003/0030404 A1 | 2/2003 | Iwaji et al. |
| 2003/0074120 A1 | 4/2003 | Kleinau |
| 2003/0150366 A1 | 8/2003 | Kaufmann et al. |
| 2004/0024505 A1 | 2/2004 | Salib et al. |
| 2004/0055810 A1 | 3/2004 | Chabaan |
| 2004/0099469 A1 | 5/2004 | Koibuchi et al. |
| 2004/0117088 A1 | 6/2004 | Dilger |
| 2004/0262063 A1 | 12/2004 | Kaufmann et al. |
| 2005/0189163 A1 | 9/2005 | Barton et al. |
| 2005/0206224 A1 | 9/2005 | Lu |
| 2005/0206229 A1 | 9/2005 | Lu et al. |
| 2005/0246085 A1 | 11/2005 | Salib et al. |
| 2005/0256620 A1* | 11/2005 | Kato .............. B60T 8/1755 701/41 |
| 2006/0060412 A1 | 3/2006 | Bolourchi et al. |
| 2006/0069481 A1 | 3/2006 | Kubota et al. |
| 2007/0299580 A1 | 12/2007 | Lin |
| 2008/0147276 A1 | 6/2008 | Pattok et al. |
| 2009/0024281 A1 | 1/2009 | Hwang et al. |
| 2009/0105907 A1* | 4/2009 | Yamaguchi ......... B62D 5/008 701/41 |
| 2009/0125186 A1 | 5/2009 | Recker et al. |
| 2009/0143938 A1 | 6/2009 | Nishimura |
| 2009/0216407 A1 | 8/2009 | Cottard et al. |
| 2009/0240389 A1 | 9/2009 | Nomura et al. |
| 2009/0271075 A1 | 10/2009 | Hales et al. |
| 2009/0292421 A1 | 11/2009 | Williams et al. |
| 2009/0294206 A1 | 12/2009 | Oblizajek et al. |
| 2010/0100283 A1 | 4/2010 | Hales et al. |
| 2010/0286869 A1 | 11/2010 | Katch et al. |
| 2011/0010054 A1 | 1/2011 | Wilson-Jones et al. |
| 2011/0022272 A1 | 1/2011 | Hung et al. |
| 2011/0213527 A1 | 9/2011 | Itabashi et al. |
| 2011/0218706 A1 | 9/2011 | Mori et al. |
| 2011/0282552 A1 | 11/2011 | Gebregergis et al. |
| 2012/0041644 A1 | 2/2012 | Turner |
| 2012/0199414 A1 | 8/2012 | Shimizu et al. |
| 2012/0232754 A1 | 9/2012 | Champagne et al. |
| 2012/0261209 A1 | 10/2012 | Shiino |
| 2012/0312627 A1* | 12/2012 | Morishita ......... B62D 5/0463 180/446 |
| 2013/0024072 A1* | 1/2013 | Michelis ........ B62D 15/0235 701/42 |
| 2013/0030654 A1 | 1/2013 | Oblizajek et al. |
| 2013/0073146 A1 | 3/2013 | Konomi et al. |
| 2013/0124048 A1 | 5/2013 | Gruener et al. |
| 2013/0131926 A1 | 5/2013 | Champagne et al. |
| 2013/0151066 A1 | 6/2013 | Koukes et al. |
| 2013/0201047 A1 | 8/2013 | Tsai et al. |
| 2013/0261894 A1 | 10/2013 | Kojima |
| 2014/0005894 A1* | 1/2014 | Aoki ............... B62D 5/0484 701/43 |
| 2014/0149000 A1 | 5/2014 | Tamura et al. |
| 2014/0257641 A1 | 9/2014 | Champagne et al. |
| 2014/0303848 A1 | 10/2014 | Bean et al. |
| 2014/0324294 A1 | 10/2014 | Champagne |
| 2015/0012182 A1 | 1/2015 | Flehmig et al. |
| 2015/0151783 A1 | 6/2015 | Kitazume |
| 2015/0171667 A1 | 6/2015 | Kai et al. |
| 2015/0191200 A1 | 7/2015 | Tsubaki et al. |
| 2016/0001810 A1 | 1/2016 | Tsubaki |
| 2016/0031481 A1 | 2/2016 | Birsching et al. |
| 2016/0075371 A1 | 3/2016 | Varunjikar et al. |
| 2016/0107679 A1 | 4/2016 | Kimura et al. |
| 2016/0229446 A1 | 8/2016 | Tamaizumi et al. |
| 2017/0066472 A1 | 3/2017 | Wang et al. |
| 2017/0158228 A1 | 6/2017 | She |
| 2017/0232998 A1 | 8/2017 | Ramanujam et al. |
| 2017/0355396 A1 | 12/2017 | Varunjikar et al. |

FOREIGN PATENT DOCUMENTS

| | | |
|---|---|---|
| CN | 1935576 A | 3/2007 |
| CN | 100999223 B | 7/2007 |
| CN | 101142548 A | 3/2008 |
| CN | 101218146 A | 7/2008 |
| CN | 101434258 | 5/2009 |
| CN | 101522504 | 9/2009 |
| CN | 101683867 A | 3/2010 |
| CN | 101734277 A | 6/2010 |
| CN | 102019957 A | 4/2011 |
| CN | 102556065 A | 7/2012 |
| CN | 102806942 A | 12/2012 |
| CN | 102917939 A | 2/2013 |
| CN | 103079934 | 5/2013 |
| CN | 102556152 A | 7/2013 |
| CN | 104044586 A | 9/2014 |
| CN | 104334439 A | 2/2015 |
| CN | 104755358 A | 7/2015 |
| DE | 19634728 C1 | 4/1998 |
| DE | 19824914 | 12/1999 |
| DE | 19912169 A1 | 7/2000 |
| DE | 10344279 A1 | 4/2004 |
| DE | 102005004726 A1 | 8/2006 |
| DE | 102008051552 A1 | 4/2009 |
| DE | 102008036001 A1 | 2/2010 |
| DE | 102013112901 A1 | 5/2015 |

(56) References Cited

FOREIGN PATENT DOCUMENTS

| | | | |
|---|---|---|---|
| EP | 0353995 | A2 | 2/1990 |
| EP | 1127775 | A1 | 8/2001 |
| EP | 1508495 | A2 | 2/2005 |
| EP | 1623907 | A1 | 2/2006 |
| EP | 1995150 | A2 | 11/2008 |
| EP | 2028080 | A1 | 2/2009 |
| EP | 1808359 | B1 | 4/2009 |
| EP | 2184218 | A2 | 5/2010 |
| EP | 2275323 | A1 | 1/2011 |
| EP | 2223838 | B1 | 11/2011 |
| EP | 2492168 | A1 | 8/2012 |
| EP | 2497698 | A1 | 9/2012 |
| GB | 2454788 | A | 5/2009 |
| JP | 2001106099 | | 4/2001 |
| JP | 2003002222 | A | 1/2003 |
| JP | 3712876 | B2 | 11/2005 |
| JP | 2006143151 | | 6/2006 |
| JP | 3819261 | B2 | 9/2006 |
| JP | 2006248250 | A | 9/2006 |
| JP | 2007514602 | A | 6/2007 |
| JP | 2009006985 | | 1/2009 |
| JP | 2009051292 | A | 3/2009 |
| JP | 2011051409 | A | 3/2011 |
| KR | 2006083578 | A | 7/2006 |
| WO | 2005097577 | A1 | 10/2005 |
| WO | 2012014399 | A1 | 2/2012 |
| WO | WO2012066704 | A1 | 5/2012 |
| WO | 2012176553 | A1 | 12/2012 |

OTHER PUBLICATIONS

English Translation of Chinese Office Action for related CN Application No. 20121058416.7; dated Dec. 3, 2014; 15 pages.
English Translation of Chinese Office Action for related CN Application No. 201210586416.7; dated Aug. 12, 2015; 14 pages.
English Translation of CN Office Action & Search Report for related CN Application No. 201410086920.X; dated Nov. 5, 2015; 10 pages.
Extended EP Search Report for related EP Application No. 121929673, dated Apr. 2, 2013; 8 pages.
Extended European Search Report for related EP Application No. 14156987.1; dated Jan. 21, 2015; 8 pages.
Extended European Search Report for related EP Application No. 15173865.5; dated Nov. 23, 2015; 10 pages.
van der Jagt, Pim; "Prediction of Steering Efforts During Stationary or Slow Rolling Parking Maneuvers"; Ford Forschungszentrum Aachen GmbH.; Oct. 27, 1999; 20 pages.
European Search Report for Application No. 14166178.5 dated Aug. 22, 2014; 7 pages.
D.I. Katzourakis, et al.; "Steering force-feedback for human machine interface automotive experiments"; IEEE Trans. Instrum. Meas., vol. 60, No. 1, pp. 32-43, Jan. 2011.
European Search Report for Application No. EP14192466.2 dated Apr. 9, 2015.
J.C.F. de Winter, et al.; "A two-dimensional weighting function for a driver assistance system"; IEEE Trans. Syst., Man, Cybern. B, Cybern., vol. 38, No. 1, pp. 189-198, Feb. 2008.
Road-Departure Prevention in an Emergency Obstacle Avoidance Situation; Katzourakis, D.I., et al.; Systems, Man, and Cybernetics: Systems, IEEE Transactions on; vol. 44, Issue 5; DOI: 10.1109/TSMC.2013.2263129; Publication Year 2014, pp. 621-629.
English Translation of CN Chinese Office Action for related Chinese Application No. CN201410086920.X, dated May 23, 2016, 17 pages.
Ansgar Rehm, Vehicle Velocity Estimation by Dynamic Inversion of Wheel Force Generation; Control Conference (ECC), 2009 European Year: 2009; pp. 4798-4803.
China Patent Application No. 201210586416.7 3rd Office Action dated Feb. 15, 2016, 14 pages.

English Translation of CN Office Action & Search Report for related CN Application No. 2014110331120.X; dated Nov. 30, 2015; 9 pages.
European Patent Application No. 14192466.2; office action dated Feb. 5, 2016; 7 pages.
European Patent Application No. 15184544.3-1755 Extended EP Search report, dated Mar. 14, 2016; 7 pages.
Hsu, Yung-Hsiang Judy, "Estimation and Control of Lateral Tire Forces using Steering Torque"; Dissertation of Stanford University, Mar. 2009; 191 pages.
Peroutka, et al., Design Considerations for Control of Traction Drive with Permanent Magnet Synchronous Machine; Power Electronics and MOtion Control Conference, 2008, EPE-PEMC 2008, 13th Year: 2008; pp. 1529-1534, DOI: 10.1109/EPEPEMC.2008.4635484.
Pornsarayouth, S., et al., Sensor Fusion of Delay and Non-delay Signal using Kalman Filter with Moving Covariance, Robotics and Biomimetics, 2008, ROBIO 2008, IEEE International Conference on: Year 2009; pp. 2045-2049, DOI: 10.1109/ROBIO.2009.4913316.
Wilhelm, et al., Friction Compensation Control for Power Steering, Control Systems Technology, IEEE Transactions on; Year: 2015, vol. PP, Issue: 99; pp. 1-14, DOI:10.1109/TCST.2015.2483561.
CN Patent Application No. 201210586416.7 4th Office Action dated Sep. 21, 2016, 8 pages.
CN Patent Application No. 201410643844.8, First Office Action dated Aug. 22, 2016, 17 pages.
CN Application No. 2014106438448 Second Office Action, dated Apr. 24, 2017, 9 pages.
CN Application No. 201510617600 Office Action dated Apr. 12, 2017, 8 pages.
CN Application No. 201510742251 First Office Action dated Apr. 26, 2017, 8 pages.
English Abstract of Li Yong et al., Control Technique of Vehicle Stability, Jan. 31, 2013, Mechanical Industry Press, 1 page.
Gillespie, Thomas D., Fundamentals of Vehicle Dynamics, 2000, pp. 201-208, Society of Automotive Engineers—Authorized Simplified Chinese translation edition by Scientific & Technical Publishing Co., 2006, pp. 138-142 (correspond to original pp. 201-208).
Gillespie, Thomas D., Fundamentals of Vehicle Dynamics, 2000, pp. 201-208, Society of Automotive Engineers.
Li Yong et al., Control Technique of Vehicle Stability, Jan. 31, 2013, pp. 137-138, Mechanical Industry Press.
DE Application No. 102016116291.4 Translation of Office Action dated Mar. 5, 2018, 5 pages.
DE Application No. 102016116292.2 Translation of Office Action dated Mar. 5, 2018, 5 pages.
Athira Vijayan et al., Precise Tuning for Power Steering, International Conference on Wireless Communications, Signal Processing and Networking (IEEE WiSPNET), 2017, pp. 2309-2313.
Dongpil Lee et al., Disturbance Adaptive Steering Wheel Torque Control for Enhanced Path Tracking of Autonomous Vehicles, American Control Conference (ACC), May 24-26, 2017, pp. 2321-2326, Seattle, WA USA.
Frederic Wilhelm et al., Friction Compensation Control for Power Steering, IEEE Transactions on Control Systems Technology, Jul. 2016, pp. 1354-1367, vol. 24, No. 4, IEEE Journals & Magazines.
Luis Daniel Sosa Ruiz et al., Design and Construction of a Passive Mechanism for Emulation of Load Forces in an Electric Power Steering System, Sep. 20-22, 2017, pp. 1-6, 2017 14th IEEE International Conference on Electrical Engineering, Computing Science and Automatic Control (CCE), Mexico City, Mexico.
English Translation of Chinese Office Action & Search Report for Chinese Application No. 201611113750.5 dated Apr. 25, 2018, 10 pages.
English Translation of Chinese Office Action & Search Report for Chinese Application No. 201611113886.6 dated Apr. 27, 2018, 7 pages.

* cited by examiner

PROVIDING ASSIST TORQUE WITHOUT HAND WHEEL TORQUE SENSOR

CROSS-REFERENCES TO RELATED APPLICATIONS

This patent application claims priority to U.S. Provisional Patent Application Ser. No. 61/817,578, filed Apr. 30, 2013 and U.S. Provisional Patent Application Ser. No. 61/904,691, filed Nov. 15, 2013. U.S. Provisional Patent Application Ser. No. 61/817,578 and U.S. Provisional Patent Application Ser. No. 61/904,691 are incorporated herein by reference in their entirety.

BACKGROUND OF THE INVENTION

In a typical electric power steering (EPS) system of a vehicle, a hand wheel torque sensor is used to determine the driver requested assist torque. When the hand wheel torque sensor becomes faulty and does not function properly, the EPS system may not be able to provide the assist torque. In some cases, the vehicle is also put in a Limp Home mode, in which the vehicle operates in a limited fashion, when the hand wheel torque sensor becomes faulty. Accordingly, it is desirable to have an EPS system that better handles a situation of a faulty hand wheel torque sensor.

SUMMARY OF THE INVENTION

In one embodiment of the invention, a method of controlling an electric power steering system of a vehicle is provided. The method determines that one or more hand wheel torque sensors of the vehicle are not enabled. The method generates an assist torque command by estimating a lateral acceleration of the vehicle based on a hand wheel angle and determining an amount of assist torque based on the estimated lateral acceleration. The method controls the electric power steering system using the generated assist torque command.

In another embodiment of the invention, a system of a vehicle comprises a power steering system that includes one or more hand wheel torque sensors and a control module. The control module is configured to determine that one or more of the hand wheel torque sensors are not enabled. The control module is further configured to generate an assist torque command by estimating a lateral acceleration of the vehicle based on a hand wheel angle and determining an amount of assist torque based on the estimated lateral acceleration. The control module is further configured to control the power steering system using the generated assist torque command.

In yet another embodiment of the invention, a method of controlling an electric power steering system of a vehicle is provided. The method determines that one or more hand wheel torque sensors of the vehicle are not enabled. The method generates an assist torque command by estimating a non-straight movement rate of the vehicle based on a hand wheel angle and determining an amount of assist torque based on the estimated non-straight movement rate. The method controls the electric power steering system using the generated assist torque command.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
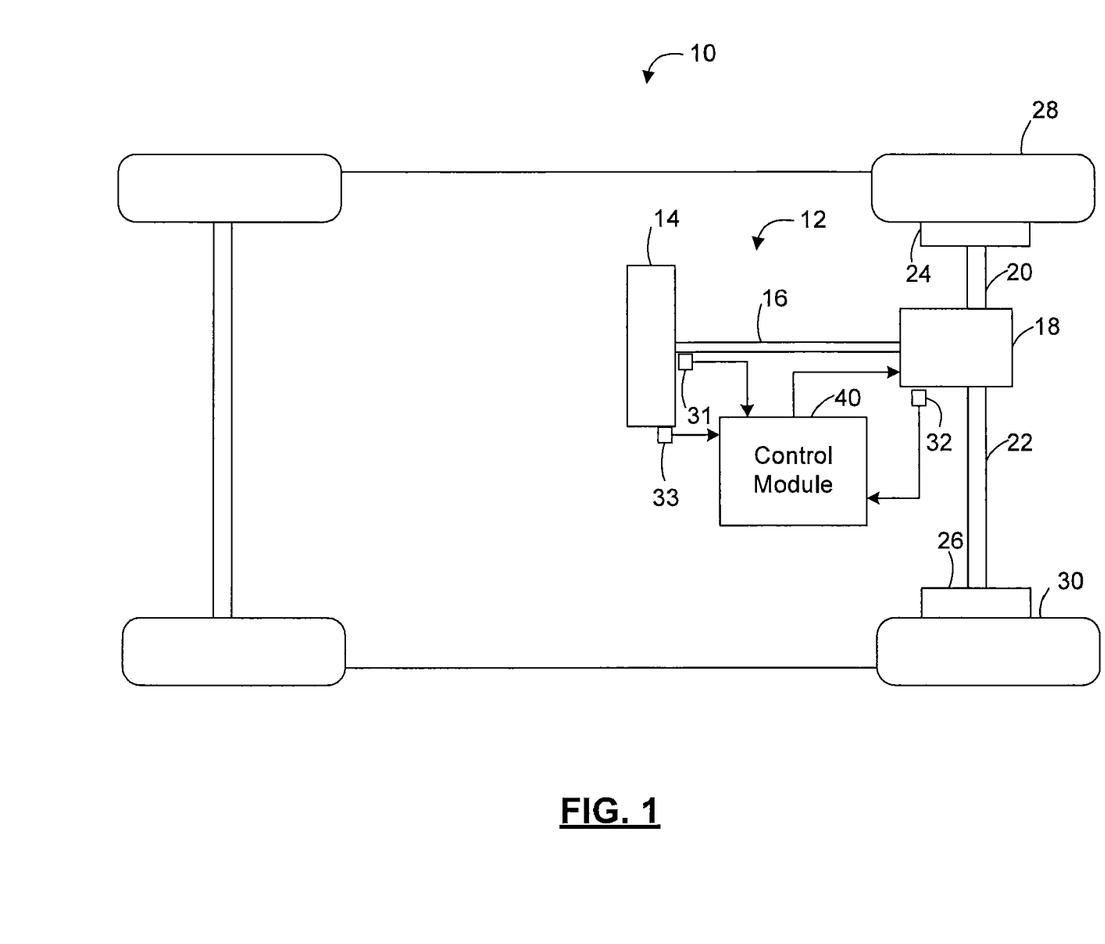
FIG. 1 illustrates a functional block diagram of a steering system that includes an assist torque calculation system in accordance with exemplary embodiments of the invention.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator (driver), the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In various embodiments, the sensors 31-33 include, for example, a hand wheel torque sensor, a hand wheel angle sensor, a lateral acceleration sensor, a yaw rate sensor, roadway wheel velocity sensors, and other sensors. In one embodiment, some of these sensors have redundant or backup sensors to validate or complement the sensor signals. The sensors 31-33 send the signals to the control module 40.

In various embodiments, a control module 40 controls the operation of the steering system 12 and/or the vehicle 10 based on one or more of the enabled sensor signals and further based on the assist torque calculation system and method of the present disclosure. Generally speaking, the method in various embodiments of the invention generates an assist torque command without using a hand wheel torque signal, which typically indicates the driver requested assist, when the hand wheel torque sensor supplying the hand wheel torque signal becomes un-enabled or faulty. In one embodiment, the method switches to a Limp Home mode for the faulty hand wheel torque sensor. In addition, the method alerts the driver of the vehicle that the steering system is in a faulty condition using mechanisms such as with tell-tales, including lights, audio warnings, etc. The driver will also be notified of a faulty condition by a change in the steering feel.

Figure 2:
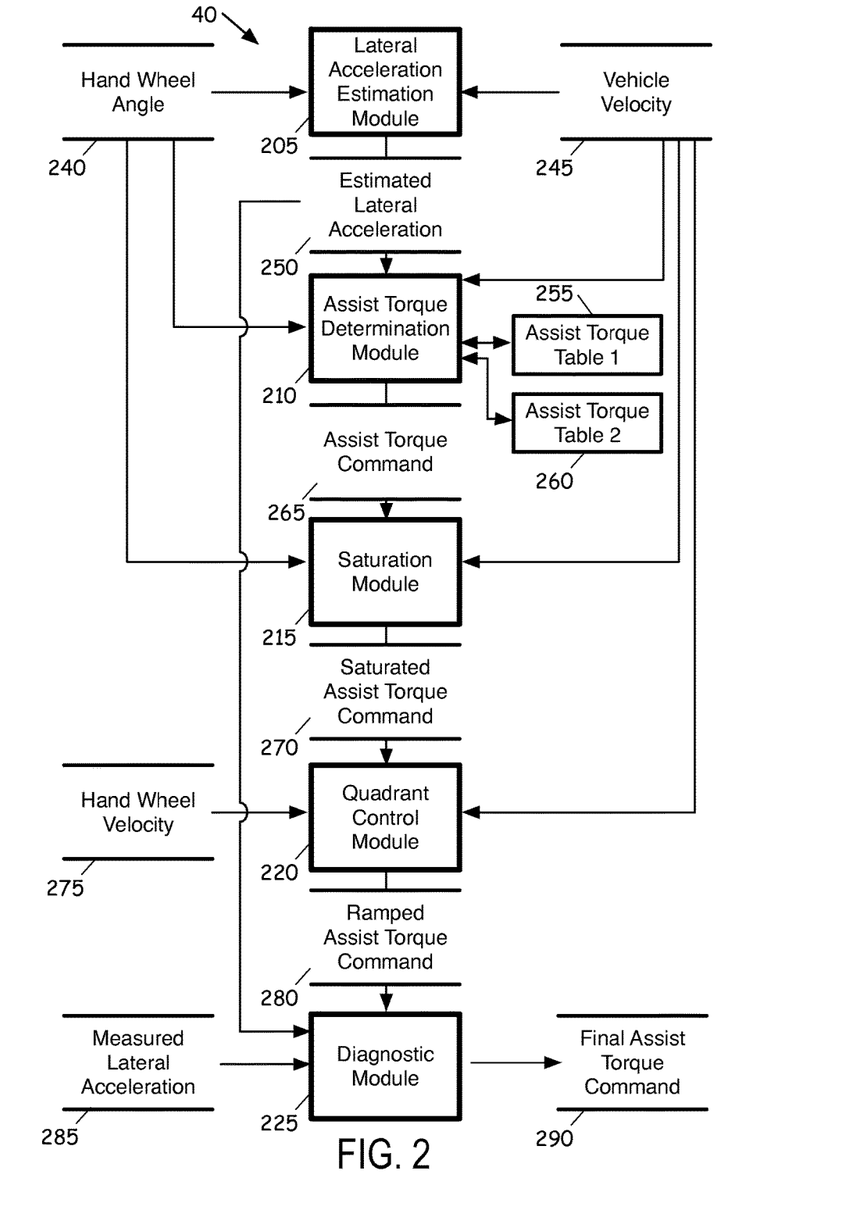
FIG. 2 illustrates a dataflow diagram illustrating an assist torque calculation system in accordance with exemplary embodiments of the invention.

FIG. 2 depicts a dataflow diagram of the control module 40 of FIG. 1 that is used to control the steering system 12 and/or the vehicle 10 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly calculate assist torque. As can be appreciated, the sub-modules shown in FIG. 2 can be implemented as a single control module 40 (as shown) or multiple control modules (not shown). Inputs to the control module 40 can be generated from the sensors of the vehicle 10 (FIG. 1), can be modeled within the control module 40 (e.g., by other sub-modules (not shown)), can be received from other control modules (not shown), and/or can be predefined. In one example, the control module 40 includes a lateral acceleration estimation module 205, an assist torque determination module 210, a saturation module 215, a quadrant control module 220, and a diagnostic module 225.

The lateral acceleration estimation module 205 receives as input a hand wheel angle (HWA) signal 240 and a vehicle velocity signal 245. The lateral acceleration estimation module 205 estimates lateral acceleration of the vehicle 10 based on the HWA signal and the vehicle velocity signal 245. In one embodiment, the lateral acceleration estimation module 205 uses the following lateral acceleration gain equation:

$$A_y = \frac{\frac{V^2}{wb}}{\left(us(V) \times \frac{V^2}{wb} + (9.81 \times 57.3)\right) \times sr} \times HWA \times K_{sf}(V) \quad (1)$$

where V is the vehicle velocity signal 245; wb is the wheelbase of the vehicle; sr is the steering ratio of the vehicle; us(V) is the understeer gradient that is a function of the vehicle velocity V; HWA is the HWA signal 240; 9.81 is a gravitational acceleration constant; $K_{sf}(V)$ is a speed correction factor that is a function of the vehicle velocity V; and $A_y$ is the estimated lateral acceleration. In one embodiment, the parameters and constants as well as lookup tables for identifying vehicle velocity-dependent parameters (e.g., us(V) and $K_{sf}(V)$) used in the lateral acceleration gain equation (1) are stored in a memory (not shown) of the control module 40.

The lateral acceleration gain equation (1) is derived from a lateral acceleration gain equation described on page 205 of Gillespie, T. D. Fundamentals of Vehicle Dynamics. Warrendale, Pa.: Society of Automotive Engineers, 1992 (hereinafter "Gillespie"), which is incorporated herein by reference. Compared to the equation described in Gillespie, the equation (1) includes several new factors, namely, $K_{sf}(V)$) and us(V) that replaces the understeer gradient parameter of the equation described in Gillespie. By these new factors, the vehicle velocity range (i.e., a range for V) in which the equation (1) is valid for $A_y$ is extended from the vehicle velocity range in which the equation described in Gillespie is valid. That is, the lateral acceleration value computed using the equation (1) is valid or less erroneous for a wider vehicle velocity range.

The calculated lateral acceleration estimation 250 is supplied to the assist torque determination module 210, which also takes as input the vehicle velocity signal 245. The assist torque determination module 210 determines an initial assist torque command 265 that specifies the assist torque to be generated by the EPS. In one embodiment, the assist torque determination module 210 uses two or more look up tables to determine assist torque. In one example, the assist torque determination module 210 uses assist torque tables 255 and 260. The assist torque tables 255 and 260 are indexed by the estimated lateral acceleration values and provide the assist torque values for the estimated lateral acceleration values. In an embodiment, the torque table 255 provides assist at a higher assist level than the torque table 260 does. When a torque sensor fails during an off-center steering event, the control module 40 provides a slightly higher assist than normal assist until the driver steers back towards the center position. In such an embodiment, once the hand wheel is near or at the center position (e.g., the absolute value of the HWA does not exceed a certain threshold angle) and the torque sensor fails, the control module 40 switches to the torque table 260 to provide a lower assist level.

The assist torque table 255 is associated with small HWA's that indicate the hand wheel is near or at the centered position. The assist torque table 260 is associated with large HWA's that indicate the hand wheel is off center (e.g., the absolute value of the HWA exceeds the threshold angle). The assist torque table 255 provides smaller assist torque than the assist torque table 260 does. That is, for a particular vehicle velocity value, the assist torque table 255 provides an assist torque value that is smaller than an assist torque value that the assist torque table 260 provides.

The assist torque command 265 is supplied to the saturation module 215, which also takes as input the vehicle velocity signal 245. In one embodiment, the assist saturation module 215 limits the assist torque command 265 to a particular range of assist torque values in order to avoid instability in the assist torque. In one embodiment, the range of assist toque values is defined based on the vehicle speed 245 and HWA 240.

The quadrant control module 220 (also referred to as a hand wheel velocity based scaling module) takes as input the saturated assist torque command 270 and the hand wheel velocity signal 275. In some cases, the saturated assist torque command 270 outputted by the saturation module 215 may not provide the natural return of the hand wheel to the centered position when the driver's hands are removed from the hand wheel. To provide the natural return, the quadrant control module 220 reduces the assist torque values represented by the assist torque command 270. In one embodiment, the quadrant control module 220 ramps down the assist torque command 270 to a minimum calibration value (e.g., approximately 30% of an assist torque value represented by the assist torque command 270) when the hand wheel velocity is less than a threshold velocity. The quadrant control module 220 ramps up the assist torque command 270 to a full calibration value (e.g., approximately 100% of an assist torque value represented by the assist torque command 270) when the hand wheel velocity is greater than a threshold velocity. The quadrant control module 220 ramps up the assist torque command when the assist torque command is in the same direction as the hand wheel velocity. The quadrant control module 220 ramps down the assist torque command when the assist torque command is in the opposite direction as the hand wheel velocity (i.e., when the assist torque command and the hand wheel velocity have different signs—quadrants II and IV).

Figure 3:
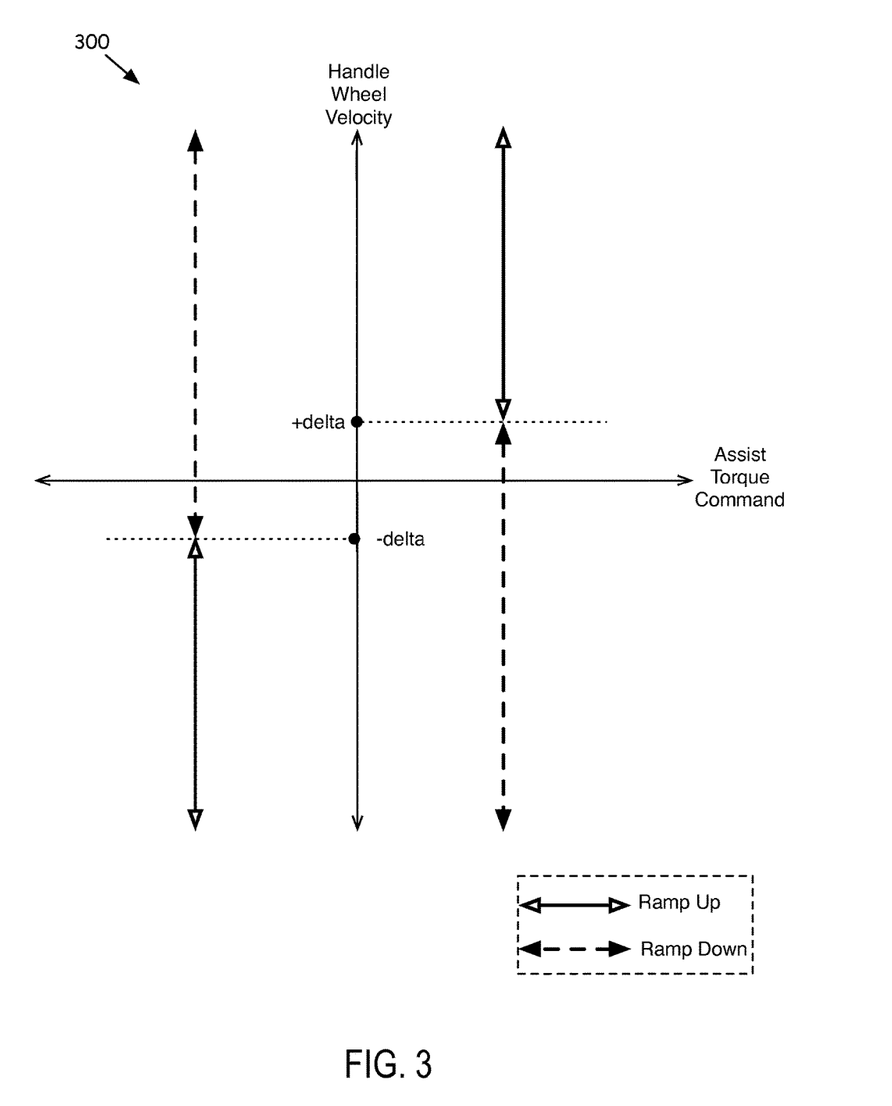
FIG. 3 illustrates a graph showing ramping up and ramping down ranges in accordance with exemplary embodiments of the invention.

More specifically, in an embodiment, the quadrant control module 220 ramps up or down the assist torque command 270 based on the following pseudo code:

```
if torque_cmd > 0 & HWV > delta, ramp up;
elseif torque_cmd > 0 & HWV =< delta, ramp down;
elseif torque_cmd < 0 & HWV < -delta, ramp up;
elseif torque_cmd < 0 & HWV >= -delta, ramp down;
``` where torque_cmd is the assist torque command 270; HWV is the hand wheel velocity 275; and delta is a threshold velocity value. The ramping up range and the ramping down range according to the above pseudo code are shown in a graph 300 illustrated in FIG. 3. The x-axis of the graph 300 represents the assist torque command 270. The y-axis of the graph 300 represents the hand wheel velocity 275. In another embodiment, the pseudo code above makes the ramping up or down decisions based on the hand wheel velocity (HWV) only and does not check the torque command (torque_cmd).

Referring back to FIG. 2, the ramped assist torque command 280 is supplied to the diagnostic module 225. The diagnostic module 225 determines whether the vehicle 10 is operating in a condition that may cause the control module 40 to generate an incorrect assist torque command. When the diagnostic module 225 determines that the vehicle is operating in such a condition, the diagnostic module 225 further scales the assist torque command according to the condition.

In one embodiment, the diagnostic module 225 determines whether the vehicle is operating in a low μ condition (i.e., the coefficient of friction of the surface on which the vehicle is operating is below a threshold value—e.g., icy road). In this example, the vehicle computes the difference between the estimated lateral acceleration 250 and a measured lateral acceleration 285. As described above, the estimated lateral acceleration 250 is calculated from the hand wheel angle 240 using the lateral acceleration gain equation (1). The measured later acceleration 285 is measured by a lateral acceleration sensor of the vehicle 10 (FIG. 1). When the difference is large, the diagnostic module 225 determines that the vehicle is operating in a low μ condition and scales down the assist torque command 280 to generate a final assist torque command 290. Several different embodiments of the diagnostic module 225 will be described below by reference to FIGS. 4 and 5.

Figure 4:
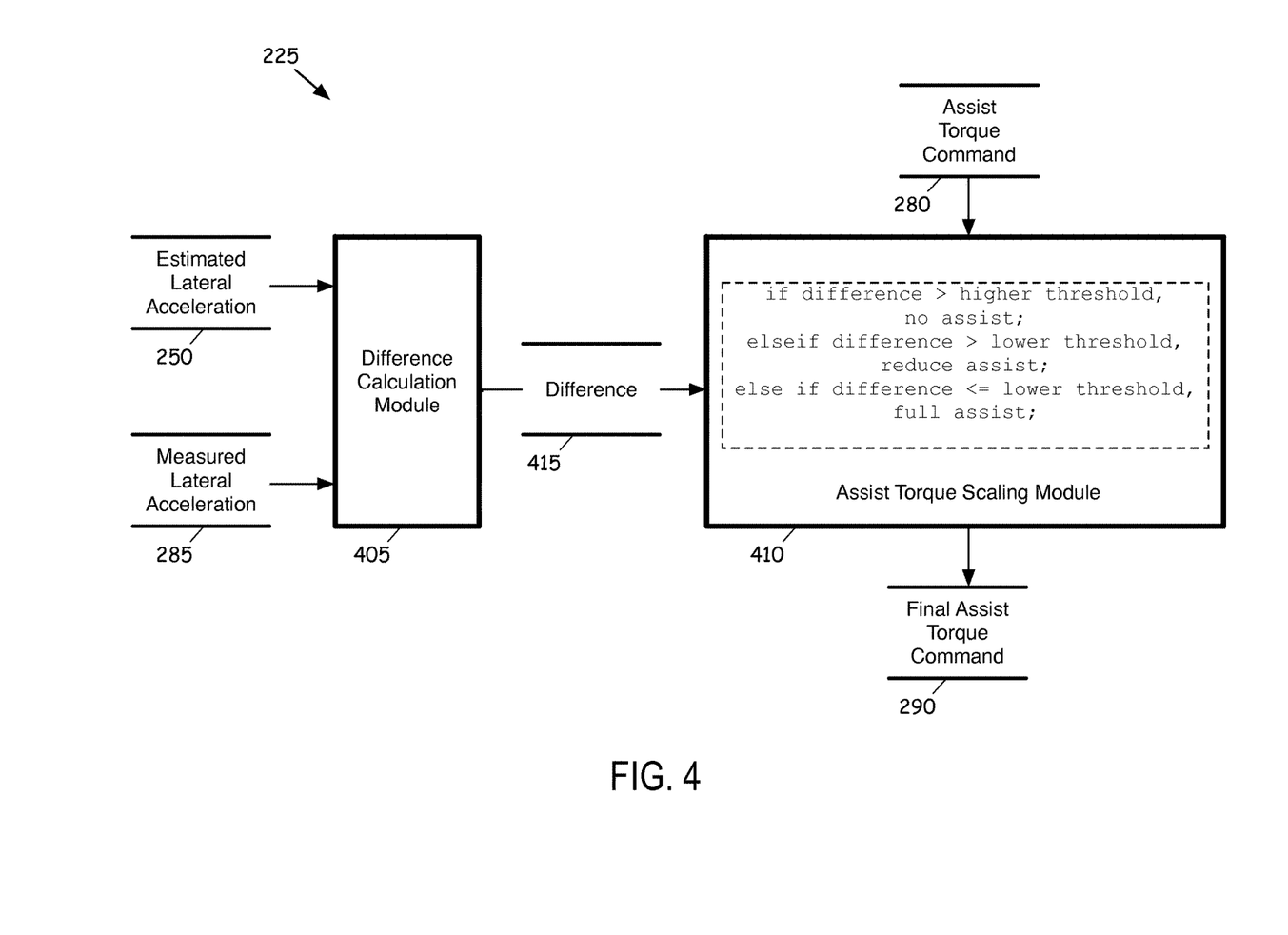
FIG. 4 illustrates a functional block diagram of a diagnostic module in accordance with exemplary embodiments of the invention.

FIG. 4 illustrates a functional block diagram of the diagnostic module 225 shown in FIG. 2. In one embodiment, the diagnostic module 225 includes a difference calculation module 405 and an assist torque scaling module 410.

The difference calculation module 405 calculates a difference 415 between the estimated lateral acceleration 250 and the measured lateral acceleration 285. Because the measured lateral acceleration 285 lags behind the estimated lateral acceleration 250, the difference calculation module 405 accounts for the lag when calculating the difference. In one embodiment, the calculated difference 415 is a positive value resulting from subtracting the measured lateral acceleration 285 from the estimated lateral acceleration 250 and taking the absolute value of the subtraction.

The assist torque scaling module 410 uses several different threshold values to scale the assist torque command 280 to generate the final assist torque command 290. In one example, the assist torque scaling module 410 uses a high threshold and a low threshold. When the difference 415 exceeds the high threshold, the assist torque scaling module 410 scales the assist torque command down to no assist (i.e., zero assist torque). That is, no assist torque is commanded when the vehicle is operating in a very low μ condition. When the difference 415 does not exceed the high threshold but exceeds the low threshold, the assist torque scaling module 415 reduces the assist torque command. In one example, the assist torque scaling module 415 scales the assist torque command down to approximately 50% of the assist torque command. As another example, the assist torque scaling module 415 limits the assist torque command to a maximum unintended assist torque value (e.g., 5-7 Nm (newton meter) at the pinion). When the difference 415 does not exceed the low threshold, the assist torque scaling module 415 does not scale down the assist torque command and sets the final torque command 290 to the full assist torque command 280.

The assist torque scaling module 410 in this example uses two thresholds. However, as can be appreciated, more than two threshold values or a single threshold value may be used to scale the assist torque command.

Figure 5:
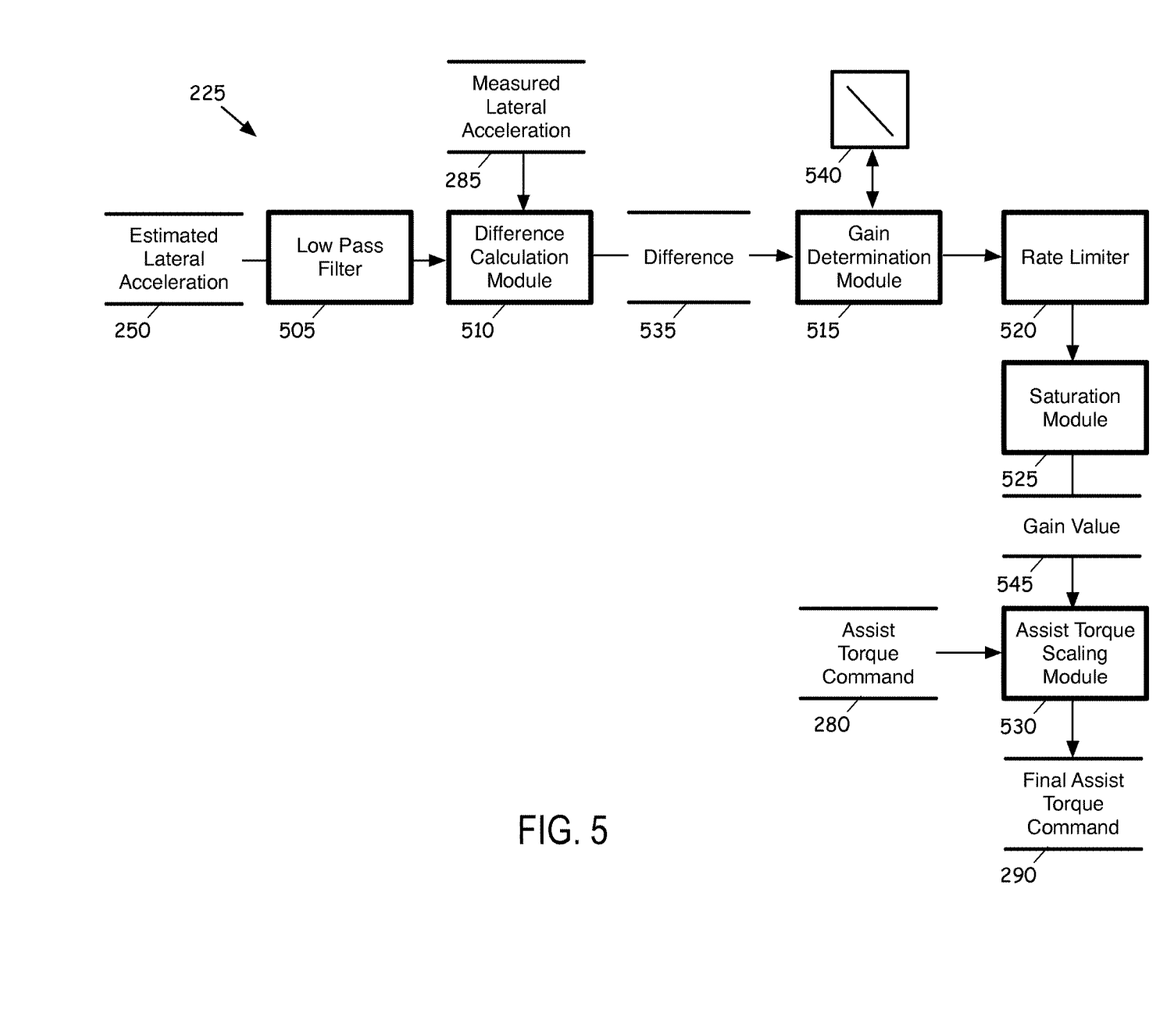
FIG. 5 illustrates a functional block diagram of a diagnostic module in accordance with exemplary embodiments of the invention.

FIG. 5 illustrates a functional block diagram of the diagnostic module 225 of exemplary embodiments. In one embodiment, the diagnostic module 225 includes a low pass filter (LPF) 505, a difference calculation module 510, a gain determination module 515, a rate limiter 520, a saturation module 525, and an assist torque scaling module 530.

In one embodiment, the LPF 505 is designed to have a particular cutoff frequency that allows the signal filtered by the LPF 505 to match the vehicle dynamics data (not shown). Specifically, the measured lateral acceleration data of the vehicle 10 (FIG. 1) when the vehicle is operating in a high μ condition (i.e., on a surface that has a high coefficient of friction) is collected. Then, the cutoff frequency that allows the measured lateral acceleration and the calculated lateral acceleration filtered by the LPF 505 to substantially match in a high μ condition is selected. Also, because the measured lateral acceleration 285 lags behind the estimated lateral acceleration 250, in one embodiment, the LPF 505 is designed to add a lag to the estimated lateral acceleration 250.

In one embodiment, the LPF 505 is a calibratable, first order filter. As can be appreciated, the LPF 505 may also be a higher order filter designed to match the calculated lateral acceleration to the measured lateral acceleration in a high μ condition. In one embodiment, the LPF 505 is designed to pick a frequency band in which the calculated lateral acceleration matches to the measured lateral acceleration in a high μ condition by using a chirp signal.

The difference calculation module 510 calculates a difference 535 between the calculated and filtered lateral acceleration 250 and the measured lateral acceleration 285. The difference 535 is a positive value resulting from subtracting the measured lateral acceleration 285 from the estimated lateral acceleration 250 and taking the absolute value of the subtraction.

The gain determination module 515 determines a gain value based on the difference 535. A gain value represents a scaling factor used to scale the assist torque command 280. In one embodiment, the gain determination module 515 looks up a table 540 indexed by different values of the difference 535. The table 540 provides a higher gain value for a smaller difference 535 and provides a lower gain value for a larger difference 535 as illustrated by the depicted sloped down curve.

The rate limiter 520 limits the rate of changing of the gain values. That is, the rate limiter 520 reduces the gain values outputted from the gain determination module 515 when a rate of change from a previously outputted gain value to a currently outputted gain value exceeds a certain rate limit.

The saturation module 525 limits the gain value to a particular range of gain values. In one embodiment, the saturation module 525 limits the gain value received from the rate limiter 520 to a range from zero to one. The gain value 545 is then supplied to the assist torque scaling module 530, which scales the assist torque command 280 using the gain value 545. In one embodiment, the assist torque scaling module 530 scales the assist torque command 280 by multiplying the assist torque command 280 by the gain value 545 to generate the final assist torque command 290.

Figure 6:
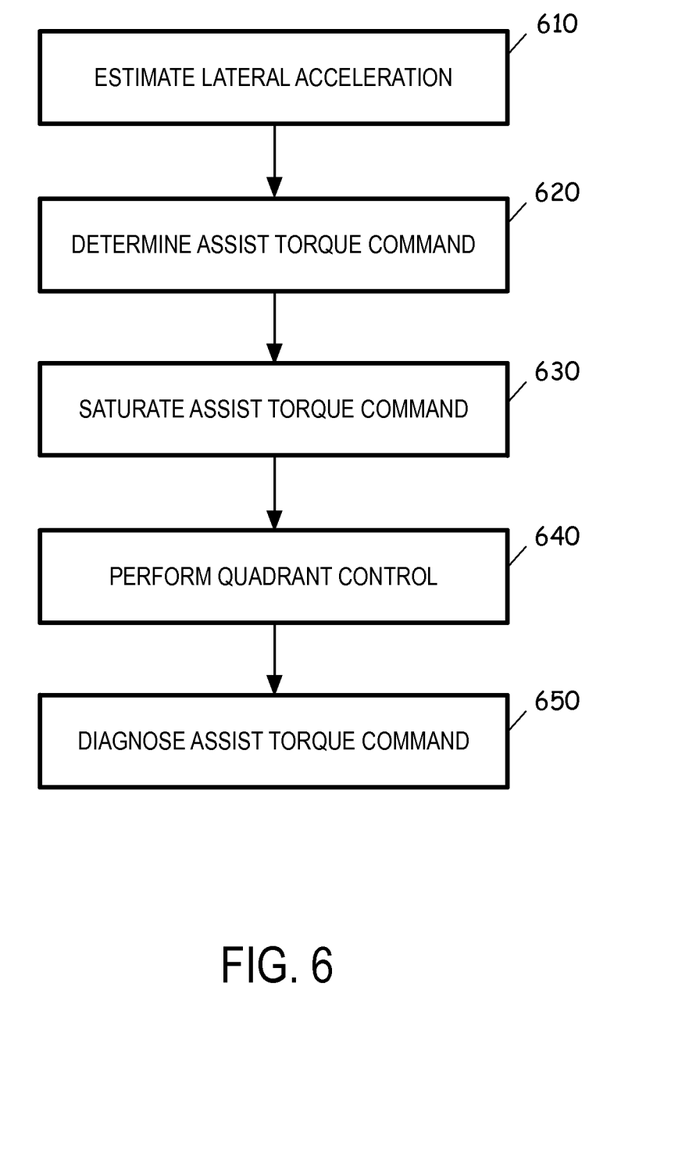
FIG. 6 illustrates a flow diagram illustrates an assist torque command calculation method in accordance with exemplary embodiments of the invention.

Referring now to FIG. 6, a flow diagram illustrates an assist torque command calculation method that can be performed by the control module 40 of FIGS. 1, 2 and 5. As can be appreciated in light of the disclosure, the order of operation within the method is not limited to the sequential execution as illustrated in FIG. 6, but may be performed in one or more varying orders as applicable and in accordance with the present disclosure. In various embodiments, the method can be scheduled to run based on predetermined events, and/or run continually during operation of the vehicle 10. The method does not use a hand wheel torque signal from a hand wheel torque sensor to calculate the assist torque command.

In one example, the lateral acceleration estimation module 205 at block 610 estimates the lateral acceleration based on the hand wheel angle signal 240 and the vehicle velocity 245. In one embodiment, the lateral acceleration estimation module 205 uses the lateral acceleration gain equation (1) described above to calculate the lateral acceleration signal 250.

At block 620, the assist torque determination module 210 determines an assist torque command based on the estimated lateral acceleration signal 250. In one embodiment, the assist torque determination module 210 looks up the assist torque tables 255 and 260 to determine the assist torque values represented by the assist torque command 265.

At block 630, the saturation module 215 limits the assist torque command 265 to a range of assist torque values. The quadrant control module 220 at block 640 performs a quadrant control on the assist torque command 270 received from the saturation module 215. The assist torque command 270 is scaled based on the magnitude of the hand wheel velocity 275 and the direction of the assist torque command 270 with respect to the hand wheel velocity 275.

At block 650, the diagnostic module 225 determines whether the vehicle 10 is operating in a condition that may cause the control module 40 to generate an incorrect assist torque command. When the diagnostic module 225 determines that the vehicle is operating in such a condition, the diagnostic module 225 further scales the assist torque command according to the determined condition. In one embodiment, the diagnostic module 225 scales the assist torque command 280 based on the difference between the calculated lateral acceleration 250 and the measured lateral acceleration 285. In one embodiment, the calculated lateral acceleration 250 is filtered by the LPF 505 before the difference is calculated.

In one embodiment, the diagnostic module 225 at block 650 also determines whether the hand wheel angle 240 that is used to estimate the lateral acceleration at block 610 is valid. In one embodiment, the diagnostic module 225 computes an expected hand wheel angle based on the measured lateral acceleration 285. More specifically, the diagnostic module 225 computes the expected hand wheel angle by solving the lateral acceleration gain equation (1) for HWA using the measured lateral acceleration 285 as $A_y$. Alternatively, in one embodiment, the diagnostic module 225 computes the expected hand wheel angle using a yaw rate gain equation:

$$r = \frac{\frac{V}{wb}}{\frac{us \times V^2}{9.81 \times 57.3 \times wb} + 1} \times HWA \qquad (2)$$

where V is the vehicle velocity signal 245; wb is the wheelbase of the vehicle; sr is the steering ratio of the vehicle; us is the understeer gradient; HWA is the HWA signal 240; 9.81 is a gravitational acceleration constant; and r is a yaw rate. The yaw rate gain equation (2) is described on page 206 of the above-incorporated Gillespie, T. D. Fundamentals of Vehicle Dynamics. Warrendale, Pa.: Society of Automotive Engineers, 1992. Specifically, the diagnostic module 225 solves the yaw rate gain equation (2) for HWA using a measured yaw rate as r.

The diagnostic module 225 compares the calculated, estimated hand wheel angle with the measured hand wheel angle 240. When the difference between the estimated hand wheel angle and the measured hand wheel angle 240 is greater than a threshold value, in one embodiment, the diagnostic module 225 generates an error signal indicating the hand wheel angle sensor is faulty and limits the assist torque command to the maximum unintended assist torque value. In an embodiment, the diagnostic module 225 generates an error signal only when the magnitude of the error in the hand wheel angle signal is greater than a threshold value (i.e., only under large error conditions). In such an embodiment, under moderate error conditions, the control module 40 reduces the gain in the assist torque command for a low μ condition as described above and does not generate an error signal.

In one embodiment, the diagnostic module 225 at block 650 also determines whether the vehicle velocity 245 that is used to estimate the lateral acceleration at block 610 is valid. In one embodiment, the diagnostic module 225 estimates a vehicle velocity based on roadway wheel velocities. Specifically, in one embodiment, the diagnostic module 225 estimates the vehicle velocity using a mean value of the road wheel velocities of two or more roadway wheels of the vehicle 10. The diagnostic module 225 compares the calculated, estimated vehicle velocity with the measured vehicle velocity 245. When the difference between the estimated vehicle velocity and the measured vehicle velocity 245 is greater than a threshold value, in one embodiment, the diagnostic module 225 generates an error signal indicating the vehicle velocity sensor is faulty and limits the assist torque command to the maximum unintended assist torque value.

Figure 7:
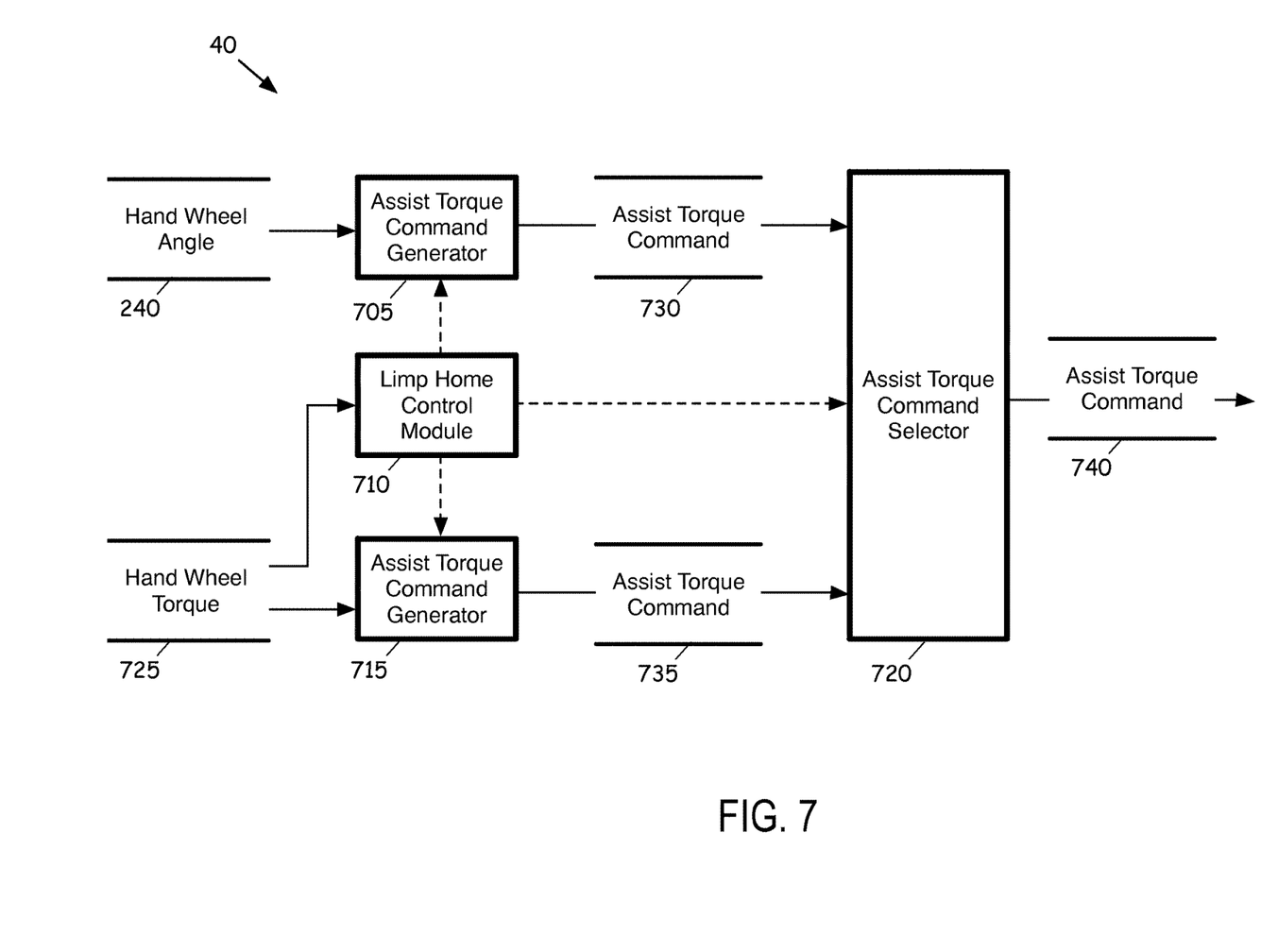
FIG. 7 illustrates a dataflow diagram illustrating an assist torque calculation system in accordance with exemplary embodiments of the invention.

FIG. 7 depicts a dataflow diagram the control module 40 of FIG. 1 used to control the steering system 12 and/or the vehicle 10 of FIG. 1 according to exemplary embodiments. In one example, the control module 40 includes a Limp Home control module 710, assist torque command generators 705 and 715, and an assist torque command selector 720.

In one embodiment, the vehicle 10 has a pair of hand wheel torque sensors (not shown in FIG. 1) that generate a pair of hand wheel torque signals 725. In one embodiment, the pair of hand wheel torque signals complement each other to represent the hand wheel torque generated by driver's turning the hand wheel of the vehicle. Specifically, the magnitudes of the signals add up to a certain value (e.g., 5 volts) and different combinations of the signal magnitudes represent different directions and different amounts of hand wheel torque. For instance, the magnitude of one signal being higher (e.g., 2.7 volt) than that of the other signal (e.g., 2.3 volt) means that a certain amount of hand wheel torque in one of the two directions (e.g., right or left) is generated as the driver turns the hand wheel. In one embodiment, the difference between the two magnitudes (e.g., 0.4 volt in a range of −5 volt to 5 volt) corresponds to the amount of the generated hand wheel torque, and the sign (e.g., plus or minus) of the difference represents the direction of the hand wheel torque. When one of the hand wheel torque sensors becomes faulty, the sum of the magnitudes of the signals would deviate from the certain value to which the magnitudes are supposed to add up.

In one embodiment, the Limp Home control module 710 monitors the hand wheel torque signals to determine whether one or both of the hand wheel torque sensors have become faulty. For instance, when the magnitudes of the signals add up to a very small value close to zero for longer than a certain period of time, the Limp Home control module 710 determines that both hand wheel torque sensors have become faulty. Also, the Limp home control module 710 determines that one of the hand wheel torque sensors has become faulty when the magnitude of the signal from the sensor is close to zero. As can be appreciated, there are many other ways for the Limp Home control module 710 to determine that one or both sensors have failed. For instance, the Limp Home control module 710 may use the historic directions and magnitudes of the assist torque generated to determine one or more of the torque sensors have failed.

The Limp Home control module 710 directs the assist torque command generators 705 and 710 and the assist torque command selection module 720 by sending one or more control signals (depicted as dotted arrows in FIG. 7) based on the determination that one or both hand wheel torque sensors become faulty. For instance, when the Limp Home control module 710 determines that both hand wheel torque sensors have become faulty, the Limp Home control module 710 directs the assist torque command generator 705 to generate an assist torque command 730 based on the hand wheel angle 240. The Limp Home control module 710 also directs the assist torque command selector 720 to select the assist torque command 730.

When the Limp Home control module 710 determines that only one of the hand wheel torque sensors has become faulty, the Limp Home control module 710 directs the assist torque command generator 715 to generate an assist torque command 735 based on the hand wheel torque signal 725 from the hand wheel torque sensor that is not faulty. The Limp Home control module 710 also directs the assist torque command generator 705 to generate the assist torque command 730 based on the hand wheel angle 240. The Limp Home control module 710 also directs the assist torque command selector 720 to select one of the assist torque commands 730 and 735.

When the Limp Home control module 710 determines that neither of the hand wheel torque sensors has become faulty, the Limp Home control module 710 directs the assist torque command generator 705 to generate the assist torque command 730 based on all of the hand wheel torque signals 725. The Limp Home control module 710 also directs the assist torque command selector 720 to select the assist torque command 730.

When the Limp Home control module 710 determines that one or both hand wheel torque sensor fails, the Limp Home control module 710 directs one or more other modules (not shown) to generate video and/or audio warnings to notify the driver that the sensor(s) have failed and that the vehicle is operating in the Limp Home mode.

The assist torque command generator 705 generates the assist torque command 730 based on the hand wheel angle 240. The assist torque command generator 705 is depicted as a single module to represent the lateral acceleration estimation module 205, the assist torque determination module 210, the quadrant control module 220, and the diagnostic module 225 shown in FIG. 1. Thus, the assist torque command 730 is the final torque command 290 generated by the modules 205-225.

The assist torque command generator 715 generates the assist torque command 735 based on one or both hand wheel torque signals 725 as directed by the Limp Home control module 710. The assist torque command selector 710 selects one of the assist torque commands 730 and 735 and outputs the selected assist torque command 740. When the assist torque command selector 710 is directed to select one of the assist torque commands 730 and 735 while only one of the hand wheel torque signals is determined to be valid, the assist torque command selector 710 in one embodiment compares the assist torque commands 730 and 735 and selects the smaller of the assist torque commands 730 and 735 at the instance of time.

Figure 8:
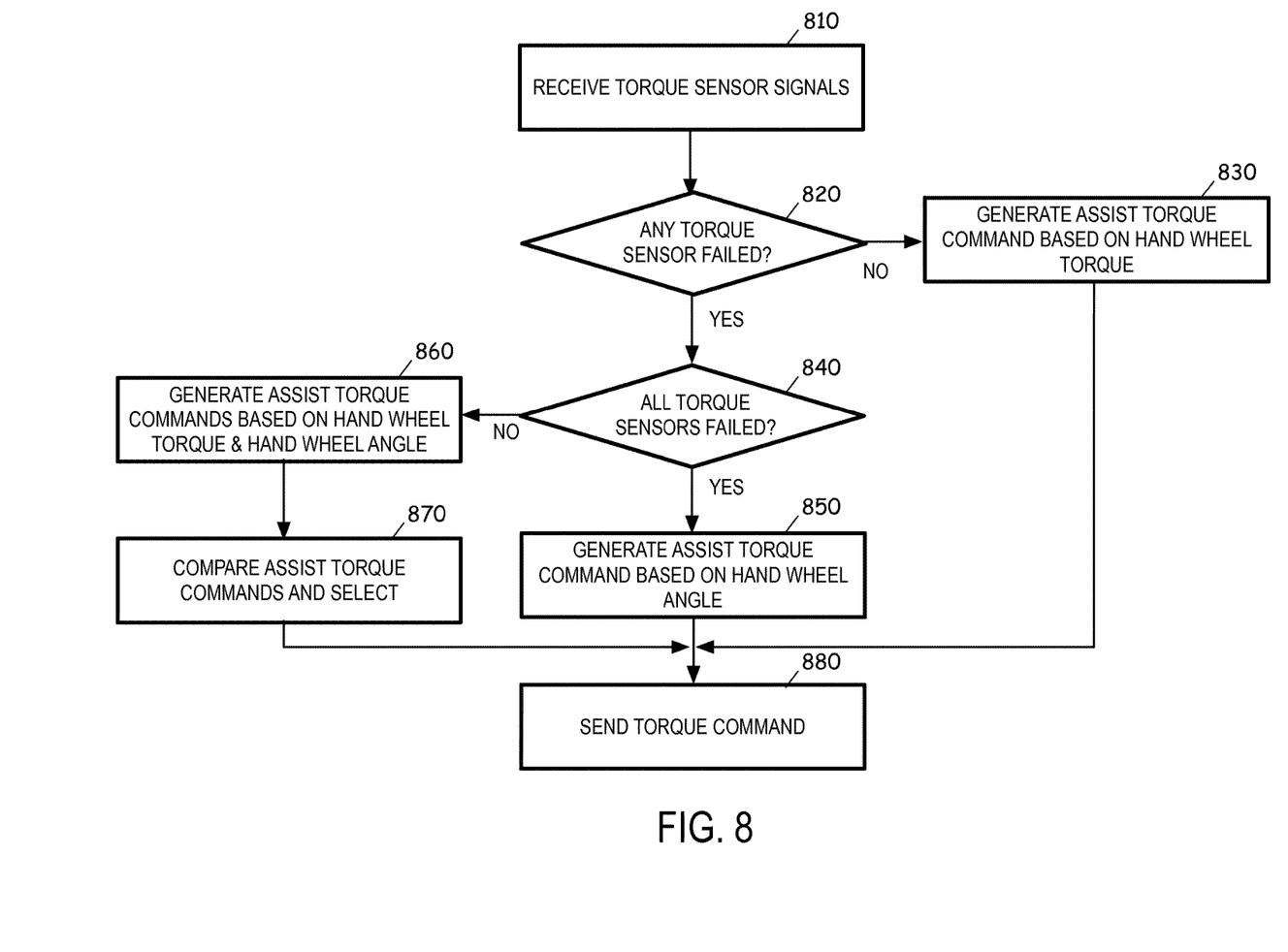
FIG. 8 illustrates a flow diagram illustrates an assist torque command calculation method in accordance with exemplary embodiments of the invention.

Referring now to FIG. 8, a flow diagram illustrates an assist torque command calculation method that can be performed by the control module 40 of FIGS. 1, 2 and 7. As can be appreciated in light of the disclosure, the order of operation within the method is not limited to the sequential execution as illustrated in FIG. 8, but may be performed in one or more varying orders as applicable and in accordance with the present disclosure. In various embodiments, the method can be scheduled to run based on predetermined events, and/or run continually during operation of the vehicle 10.

In one example, the control module 40 at block 810 receives sensor signals from the sensors 31-33 (FIG. 1). Specifically, the Limp Home control module 710 monitors the hand wheel torque signals 725 and determines at block 820 whether any of the hand wheel torque sensors of the vehicle 10 have become faulty.

When the Limp Home control module 710 determines at block 820 that none of the hand torque sensors has become faulty, the assist torque command generator 715 generates at block 830 the assist torque command 735 from all of the hand wheel torque signals 725. The method then proceeds to block 880, which will be described further below.

When the Limp Home control module 710 determines at block 820 that at least one of the hand wheel torque sensors has become faulty, the Limp Home control module 710 determines at block 840 whether all of the hand wheel torque sensors have become faulty. When the Limp home control module 710 determines at block 840 that all of the hand wheel torque sensors have become faulty, the assist torque command generator 705 generates at block 850 the assist torque command 730 based on the hand wheel angle 240. The method then proceeds to block 880, which will be described further below.

When the Limp Home control module 710 determines at block 840 at least one of the hand wheel torque sensors has not become faulty, the assist torque command generator 715 generates at block 860 the assist torque command 735 based on at least one hand wheel torque signal from the hand wheel torque sensor(s) that have not become faulty. The assist torque command generator 705 also generates at block 860 the assist torque command 730 based on the hand wheel angle 240. At block 870, the assist torque command selector 720 compares the assist torque commands 730 and 735 and selects one of the two commands that represents a lower assist torque value at that instance in time.

At block 880, the control module 40 sends the assist torque command 730 or 735 that is generated or selected at block 830, 850, 860 or 870, to the steering system 12 so that the steering system generates assist torque according to the assist torque command sent at block 880.

The embodiments of the invention so far described in the current disclosure use an estimated lateral acceleration and a measured lateral acceleration to compute an assist torque command when it is determined that a hand wheel torque sensor supplying the hand wheel torque signal is faulty. However, it is to be noted that the embodiments may use any non-straight movement rate other than a lateral acceleration rate. For instance, some embodiments of the invention may use an estimated yaw rate and a measured yaw rate in place of the measured lateral acceleration and the measured lateral acceleration, respectively, in order to compute an assist torque command. For example, these embodiments may use the yaw rate gain equation (2) to calculate the estimated yaw rate based on the measured hand wheel angle and/or the measured vehicle velocity, compare the calculated, estimated yaw rate with the measured yaw rate, and scale the assist torque command based on the difference between the estimated yaw rate and the measured yaw rate.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of controlling an electric power steering system, the method comprising:
    determining that one or more of a plurality of hand wheel torque sensors are not enabled;
    generating an assist torque command by:
        estimating a lateral acceleration based on a hand wheel angle from a hand wheel angle sensor and a vehicle velocity signal;
        determining an amount of assist torque as a first assist torque command based on the estimated lateral acceleration;
        determining whether at least one of the hand wheel torque sensors is enabled;
        generating a second assist torque command using a hand wheel torque measured by the at least one of the hand wheel torque sensors that is enabled;
        comparing the first assist torque command and the second assist torque command for a same instance of time;
        selecting a smaller of the first assist torque command and the second assist torque command as the generated assist torque command based on determining that at least one of the hand wheel torque sensors is enabled; and
        selecting the first assist torque command as the generated assist torque command based on determining that none of the hand wheel torque sensors is enabled; and
    controlling the electric power steering system using the generated assist torque command.

2. The method of claim 1,
    wherein the estimating the lateral acceleration is further based on at least one of a vehicle wheelbase, a steering ratio, a speed correction factor, and an understeer gradient,
    wherein the understeer gradient is determined based on the vehicle velocity signal, and the speed correction factor is determined based on the vehicle velocity signal.

3. The method of claim 1, wherein the determining the amount of assist torque comprises:
    determining whether the hand wheel angle exceeds a threshold angle;
    if the hand wheel angle does not exceed the threshold angle, looking up a first table using the estimated lateral acceleration, wherein the first table specifies different amounts of assist torque, is indexed by vehicle velocities, and is associated with hand wheel angles that do not exceed the threshold angle; and
    if the hand wheel angle exceeds the threshold angle, looking up a second table using the estimated lateral acceleration, wherein the second table specifies different amounts of assist torque, is indexed by vehicle velocities, and is associated with hand wheel angles that exceed the threshold angle,
    wherein an amount of assist torque specified in the first table is smaller than a corresponding amount of assist torque specified in the second table.

4. The method of claim 1, wherein the generating the assist torque command further comprises limiting the amount of assist torque to a range of assist torque based on a vehicle speed and the hand wheel angle.

5. The method of claim 1, wherein the generating the assist torque command further comprises:
    determining whether the hand wheel velocity and the assist torque have opposite signs; and
    if the hand wheel velocity and the assist torque have opposite signs, reducing the amount of assist torque.

6. The method of claim 1 further comprising:
    calculating a difference between the estimated lateral acceleration and a measured lateral acceleration;

determining whether the difference exceeds a threshold difference;
if the difference does not exceed a threshold difference, limiting the generated assist torque command to a particular amount of assist torque; and
if the difference exceeds the threshold difference, controlling the electric power steering system such that no assist torque is applied.

7. The method of claim 1 further comprising:
applying a low pass filter to the estimated lateral acceleration;
calculating a difference between the filtered, estimated lateral acceleration with a measured lateral acceleration;
determining a scaling factor based on the calculated difference; and
scaling the generated assist torque command based on the scaling factor.

8. The method of claim 7, wherein the low pass filter is configured to have a particular cutoff frequency that allows the filtered, estimated lateral acceleration and the measured lateral acceleration to match in a high μ condition.

9. The method of claim 7, wherein the low pass filter is configured to add a lag to the estimated lateral acceleration.

10. The method of claim 1, wherein the generating the assist torque command further comprises:
determining whether a hand wheel velocity exceeds a threshold velocity;
if the hand wheel velocity does not exceed the threshold velocity, reducing the amount of assist torque; and
if the hand wheel velocity exceeds the threshold velocity, increasing the amount of assist torque.

11. A system comprising:
an electric power steering system that includes a plurality of hand wheel torque sensors and a hand wheel angle sensor; and
a control module configured to:
determine that one or more of the hand wheel torque sensors are not enabled;
generate an assist torque command by:
estimating a lateral acceleration based on a hand wheel angle from the hand wheel angle sensor and a vehicle velocity signal;
determining an amount of assist torque as a first assist torque command based on the estimated lateral acceleration;
determining whether at least one of the hand wheel torque sensors is enabled;
generating a second assist torque command using a hand wheel torque measured by the at least one of the hand wheel torque sensors that is enabled;
comparing the first assist torque command and the second assist torque command for a same instance of time;
selecting a smaller of the first assist torque command and the second assist torque command as the generated assist torque command based on determining that at least one of the hand wheel torque sensors is enabled; and
selecting the first assist torque command as the generated assist torque command based on determining that none of the hand wheel torque sensors is enabled; and
control the electric power steering system using the generated assist torque command.

12. The system of claim 11, wherein the estimating the lateral acceleration is further based on at least one of a vehicle wheelbase, a steering ratio, and an understeer gradient,
wherein the understeer gradient is determined based on the vehicle velocity signal, and the speed correction factor is determined based on the vehicle velocity signal.

13. The system of claim 11, wherein the determining the amount of assist torque comprises:
determining whether the hand wheel angle exceeds a threshold angle;
if the hand wheel angle does not exceed the threshold angle, looking up a first table using the estimated lateral acceleration, wherein the first table specifies different amounts of assist torque, is indexed by vehicle velocities, and is associated with hand wheel angles that do not exceed the threshold angle; and
if the hand wheel angle exceeds the threshold angle, looking up a second table using the estimated lateral acceleration, wherein the second table specifies different amounts of assist torque, is indexed by vehicle velocities, and is associated with hand wheel angles that exceed the threshold angle,
wherein an amount of assist torque specified in the first table is smaller than a corresponding amount of assist torque specified in the second table.

14. The system of claim 11, wherein the control module is configured to generate the assist torque command further by limiting the amount of assist torque to a range of assist torque based on a vehicle speed and the hand wheel angle.

15. The system of claim 11, wherein the control module is further configured to:
apply a low pass filter to the estimated lateral acceleration, the low pass filter configured to have a particular cutoff frequency that allows the filtered, estimated lateral acceleration and the measured lateral acceleration to match in a high μ condition;
calculate a difference between the filtered, estimated lateral acceleration with a measured lateral acceleration;
determine a scaling factor based on the calculated difference; and
scale the generated assist torque command based on the scaling factor.

16. The system of claim 11, wherein the control module is configured to generate the assist torque command further by:
determining whether a hand wheel velocity exceeds a threshold velocity;
if the hand wheel velocity does not exceed the threshold velocity, reducing the amount of assist torque; and
if the hand wheel velocity exceeds the threshold velocity, increasing the amount of assist torque.

17. A method of controlling an electric power steering system, the method comprising:
determining that one or more of a plurality of hand wheel torque sensors is not enabled;
generating an assist torque command by:
estimating a non-straight movement rate based on a hand wheel angle from a hand wheel angle sensor and a vehicle velocity signal;
determining an amount of assist torque as a first assist torque command based on the estimated non-straight movement rate;
determining whether at least one of the hand wheel torque sensors is enabled;

generating a second assist torque command using a hand wheel torque measured by the at least one of the hand wheel torque sensors that is enabled;

comparing the first assist torque command and the second assist torque command for a same instance of time;

selecting a smaller of the first assist torque command and the second assist torque command as the generated assist torque command based on determining that at least one of the hand wheel torque sensors is enabled; and selecting the first assist torque command as the generated assist torque command based on determining that none of the hand wheel torque sensors is enabled; and controlling the electric power steering system using the generated assist torque command.

18. The method of claim 17, wherein the non-straight movement rate includes one of a lateral acceleration rate and a yaw rate.

19. The method of claim 17, wherein the generating the assist torque command further comprises:

determining whether a hand wheel velocity exceeds a threshold velocity;

if the hand wheel velocity does not exceed the threshold velocity, reducing the amount of assist torque; and if the hand wheel velocity exceeds the threshold velocity, increasing the amount of assist torque.

\* \* \* \* \*